UNITED STATES PATENT OFFICE.

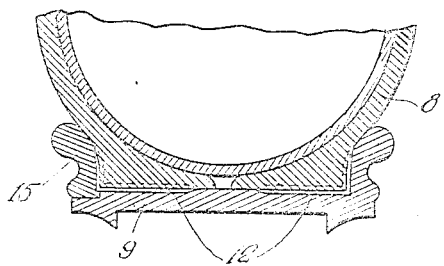
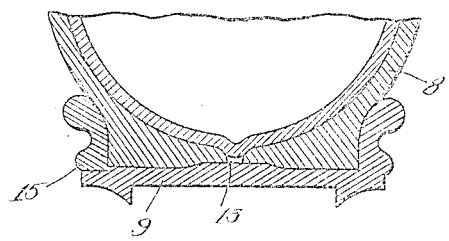
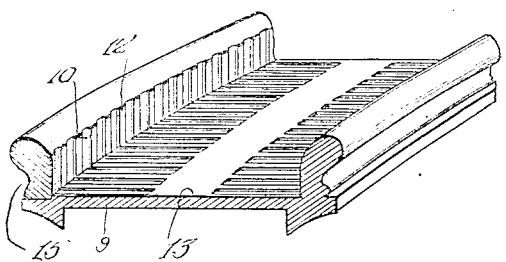
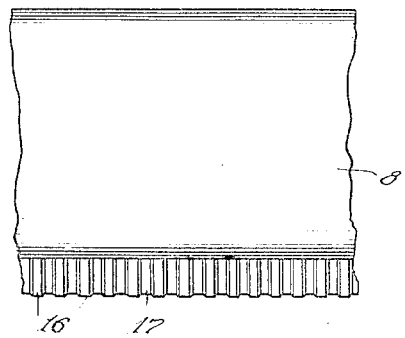
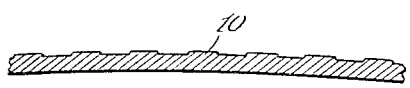
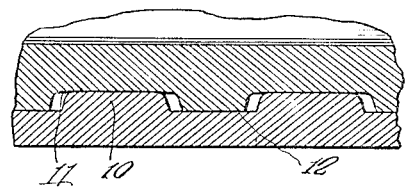

WALTER S. McCLEVEY, OF ST. LOUIS, MISSOURI.

PNEUMATIC TIRE.

1,396,515.  Specification of Letters Patent.  Patented Nov. 8, 1921.

Application filed February 21, 1920. Serial No. 360,359.

*To all whom it may concern:*

Be it known that I, WALTER S. McCLEVEY, a citizen of the United States, residing at St. Louis, in the county of St. Louis and State of Missouri, have invented certain new and useful Improvements in Pneumatic Tires, of which the following is a specification.

This invention relates to rubber tires for bicycles, automobiles, motor trucks and the like, and particularly to pneumatic tires used for such purposes. The object of the invention is to provide means for preventing slipping of the tire on the rim of the wheel, due to starting or stopping or accelerating the machine, when there is a very material tendency for the tire and rim to rotate more or less relative to each other. A particular object of the invention is to prevent injury to the air supply tube of the inner tube of the tire due to such relative rotation of the tire and rim; and at the same time to provide means for these objects which will not injure the tire or will not hinder the convenient and speedy removal or replacing of the tire on the rim.

Of the accompanying drawings Figure 1 is a transverse sectional view of a portion of a tire and the rim supporting the same which embodies the features of my invention; Fig. 2 is a somewhat similar view; Fig. 3 is a perspective view of a portion of the rim of the machine; Fig. 4 is an elevation of a portion of a tire which may be used in carrying out my invention; Fig. 5 is an enlarged fragmental view of a portion of the tire rim; and Fig. 6 is a materially enlarged portion of the tire and rim coacting.

For the purpose of convenience in this instance I will direct the description of my invention to its use on automobiles, having any ordinary type of wheel rims and pneumatic tires, and particularly such as are illustrated by Figs. 1 and 2. As is well understood, when an automobile is started, the engine tends to rotate the driving wheels so as to move the automobile forwardly or backwardly, while the tires, being in contact with the ground, tend to remain at rest; so that there is a very material force tending to rotate the wheels within the tires. The effect is similar whenever the machine is brought to rest by means of brakes, as the brakes tend to retard the tires and thus to retard the rims and wheels by means of the friction between the tires and rims. Similarly whenever there is any acceleration or retardation in the speed of the machine there is a tendency to produce relative rotation of tire and the rim of the wheel. Also this tendency is not confined to driving wheels; the same effect exists in the other wheels, though to a somewhat less extent. Any relative rotation of the tire and the rim necessarily tends to put a strain upon the tires, including the inner tubes, and particularly upon the air supply tubes, and will often tear these tubes from the inner tube or weaken the point of connection so as to cause leaks.

While I am aware that means have heretofore been used for preventing relative rotation of the tire and the rim, yet such means have objectionable features or have failed to properly accomplish the object which I have in view, and which I believe is accomplished by the particular means which I provide. The means which I provide comprise a series of ridges and grooves, or corrugations, formed in the surfaces of the rim which are to be in contact with the tire, the ridges being of such a nature as to avoid injuring the tire; also the tires themselves have corrugations and the arrangement of the corrugations in the tire and in the rims of the wheels is such that the tire may readily be slipped on and off of the rim with the ridges of one registering with the grooves of the other.

In carrying out my invention I provide on the rim 9 the ridges 10 having rounded corners 11, and with the grooves 12; the ridges extending part way across the periphery 13 of the rim, and upwardly on the sides 15 of the clamping flanges. But the ridges are much wider than the depth of the grooves, the grooves being of sufficient width to allow the heavy rubber of the tire to be forced into the grooves sufficiently to prevent slipping of the tires. And the grooves become shallower toward the ends, both on the face of the rim and on the sides of the rim, as is indicated in Fig. 1.

Fig. 1 shows generally a tire 8 and rim together before compressed air has been forced into the tire; and illustrates the way in which the tire is kept out of the rim grooves until the sides of the tire have been slid along to the proper place. Fig. 2 shows the same tire and rim after the tire is filled with compressed air with the rubber casing corrugations fitting in the corrugations of the rim.

Fig. 4 shows a fragmental elevation of a tire casing having ridges 16 and grooves 17 adapted to fit into the corrugations of the rim, the grooves of the tire, like those of the rim becoming shallower as the ends are approached, as indicated by the dotted lines in Fig. 1.

Fig. 5 shows the rim corrugations of substantially normal size as used in practice. Fig. 6 shows the corrugated tire and rim, the ridges of the tire being materially narrower than the grooves of the rim so as to facilitate putting the tire in place.

By the use of these corrugations, I eliminate substantially all slippage between the tire and the wheel, and thus prevent injury to the tires; and the particular shape and arrangement of the corrugations are such that they are very effective in producing the results sought, and present no objectionable features in putting the tires on or off or in any other way.

I claim:

1. In a pneumatic wheel a tire and rim arranged to support said tire, said tire and rim when the tire is loose on the rim having registering corrugations on opposing adjacent but not contiguous surfaces, said corrugations being held apart by the smooth surface of said tire and rim.

2. In a wheel, a pneumatic tire and a rim for supporting said tire, said rim and said tire having ridges and grooves on portions of their surfaces which are adjacent when the tire is first placed on the rim, other portions of the surfaces which are in contact being smooth and arranged to hold said respective ridges and grooves apart until the air pressure in the tube forces them together.

In testimony whereof, I hereunto set my hand.

WALTER S. McCLEVEY.